April 29, 1930.   W. C. MUNRO   1,756,432
CONTINUOUS SULPHATE PROCESS
Filed April 13, 1927
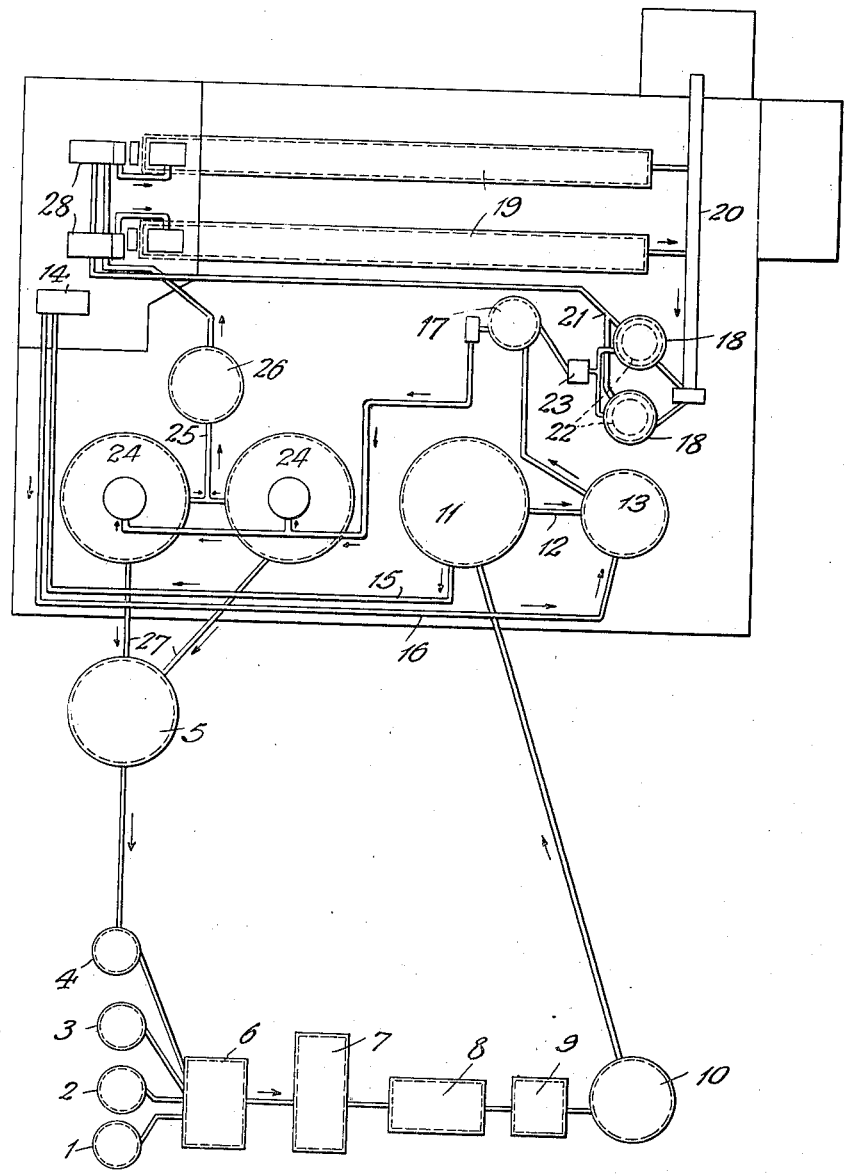
INVENTOR.
BY William C. Munro
Victor D. Borst
ATTORNEY.

Patented Apr. 29, 1930

1,756,432

UNITED STATES PATENT OFFICE

WILLIAM CAULDWELL MUNRO, OF MONTREAL, QUEBEC, CANADA, ASSIGNOR TO WILLIAM D. MOUNT, OF LYNCHBURG, VIRGINIA

CONTINUOUS SULPHATE PROCESS

Application filed April 13, 1927, Serial No. 183,368, and in Canada March 1, 1927.

My invention relates to pulping processes for the manufacture of pulp from wood for the production of paper, and particularly to the sulphate process including the kraft process, and the method of preparing the cooking or pulping liquor used therein.

An object of my invention is to provide a continuous process for manufacturing the cooking liquor used in the sulphate or kraft process for the pulping of wood, by a doubly cyclic process in which recovery of the chemicals is practised in order to reduce the loss of materials and to keep the cost at a minimum. My process includes a cyclic reutilization of the soda compounds for the production of the pulping liquor and also the cyclic reutilization of the causticizing lime, whereby no troublesome by-products are produced which must be disposed of, and whereby a large share of the cost of labor is avoided, and only such amounts of soda compounds and lime must be supplied to the process as are necessitated by the minor losses inevitable in any process.
My improved process includes a continuous clarification of the green liquor by decantation, a continuous causticizing thereof, a continuous separation of the clear, sulphate, cooking liquor from the lime sludge, a continuous filtering and washing of the lime sludge, and a continuous burning of the sludge for the production of lime adapted to re-use in the causticizer, as well as other continuous processes incidental to the sulphate process.

In the prior art of the pulping of paper by the sulphate process, the valuable solids of the spent pulping liquors are customarily recovered in the form of a crude black ash which is smelted and dissolved to produce the "green liquor", which, after causticizing and the separation of the lime sludge, becomes the white liquor for use in the digesters. To the extent that the soda compounds are re-used, the former processes are partially cyclic and continuous. It has, however, been customary to discard the spent lime sludge, the disposal of which has been a source of much difficulty to the operation of the pulping plant, since the quantity is large and no commercial use existed for the contaminated lime sludge.

By my invention I prevent the troublesome accumulation of impurities in the lime and reburn the spent lime from the causticizing unit for the re-activation thereof, so that it may be re-used for further causticizing, thereby avoiding the need for the large quantity of fresh lime otherwise necessary, and simultaneously avoiding the troublesome problem of disposing of the large quantity of calcium carbonate sludge.

My invention operates briefly as follows:— The recovered and reburned lime, together with a small make-up quantity of fresh lime, is charged into slaking tanks, with water and filtrate from the washing filters, for the production of a slaked product which may, if desired, be in the form of a milk of lime. I may use a plurality of slaking tanks, and while one tank is being charged, the slaked contents of another are pumped into a continuous causticizer, with a proper quantity of the green liquor. A reaction is brought about therein under conditions advantageous to high efficiency of reaction, by means of a current of steam and air. Suitable means are provided for the regulation of the supply both of the green liquor and of the lime, whereby very accurate control of the operation is obtainable.

The green liquor is subject to careful preparation before causticizing. The spent pulping liquor from the digesters is desirably concentrated in the usual way, reduced to substantial dryness in incinerators and smelted in a continuous smelter in the usual fashion. The smelted product is run to the dissolving tanks in the usual way and the usual recovered green liquor is thus obtained. The concentration of the liquor in the dissolving tanks is adjusted to a suitable strength and condition, such that the solid impurities will settle rapidly. The liquor is then treated by a continuous decantation for the removal of the solid impurities, whereby a clear solution is obtained. This solution is desirably held in storage, so that a substantial supply is maintained at all times but it may if desired be sent direct to the causticizer. From the storage tank the clear liquor is then desirably sent to the continuous causticizer as before described. After causticizing the sludge may be removed from the liquor. The inclusion of the continuous decanter acting upon the impure green liquor is an important part of the system of my invention, since if the impurities are allowed to enter the causticizer they contaminate the lime sludge to such an extent as to prevent satisfactory reburning and reuse. The impurities separated from the green liquor by the decanter are desirably washed upon a suitable filter, which may be a rotary filter, the operation of which may be facilitated by the addition of a suitable amount of sand or other filter aid to prevent the passage through of colloidal material. The relative quantity of impurities so obtained is small, though of sufficient quantity to seriously contaminate the lime sludge, and the impurities being of no economical value, may be discarded and disposed of without difficulty. The wash water from the filters contains a substantial amount of dissolved soda compounds of value, which may be returned to a suitable point in the cycle, such as the dissolving tank or the green liquor storage tank.

The causticized liquor may be separated from the lime sludge by a suitable means such as a continuous decanter. The white liquor then may be pumped to a suitable storage tank for ultimate delivery to the digesters. The sludge may be transferred to suitable sludge filters for the recovery of further soda salts and to prepare the lime for the lime kiln. In the kiln the sludge is reburned to lime which may be re-slaked and used for further causticizing.

By this means I produce a doubly cyclic system for the pulping of wood, in which a recovery both of the pulping agent and the causticizing agent occurs. By this means I avoid the loss of substantial values of the lime, and avoid the necessity for the purchase of large quantities of fresh causticizing lime, as well as avoiding the necessity for disposal of large quantities of spent materials. The system of my invention has other important advantages, such as compactness of installation, lower labor costs in the operation thereof, lower repair charges, much lower chemical losses, lower steam consumption, greater uniformity of product, the saving of lime previously mentioned, and a substantial, valuable and important increase in efficiency.

Other objects and structural details of my invention will be apparent from the following description when read in connection with the accompanying drawing, wherein:

The single figure is a diagrammatic representation of the apparatus of my invention, showing the elements, the connections therebetween, and the directon of travel and sequence of operations incidental to the operation of my process.

In the drawing, a group of digesters 1, 2, 3 and 4 are provided, which may be of any suitable form adapted to the pulping of wood by the kraft, or sulphate, liquor. The digesters are supplied with fresh, white, cooking liquor from a storage tank 5, and after the completion of the reaction in the usual way, after the usual time, the pulp and spent black liquor are discharged to a blow tank or washing unit 6 in the usual fashion. The pulp and spent liquor are separated in the customary way, the pulp being sent to pulp screens for the usual treatment and the spent liquor being sent to an evaporator 7 of any suitable type, in which it is concentrated to a thick solution. The concentrated solution is then transferred to an incinerator unit 8 in which the water is removed to reduce the chemical compounds nearly to dryness to produce a black ash. This is discharged to a usual smelter unit 9, from which the molten smelt is transferred to a dissolving tank 10 and taken up in a suitable quantity of water to form what is known in the art as "green liquor". This product consists essentially of an aqueous solution of sodium carbonate, sodium sulphide, and sodium hydroxide, with certain quantities of solid impurities such as silica, ferrous sulphides and the like. The foregoing steps are a sequence which is old in the art and in common use.

It is in the succeeding steps in which the features of my invention lie, including means for the prevention of contamination of the causticizing lime and the cyclic reutilization thereof.

In the prior art it has been customary to transfer the green liquor directly from the dissolving tanks to the causticizing units. By my invention, however, the green liquor is transferred from the dissolving tank 10 to a continuous clarifier or decanter for the removal of the insoluble and suspended impurities or solids which are carried with it.

In the cold, or if allowed to cool, the character of the "green liquor" solution and suspended impurities is such that they settle with extreme slowness. It has been considered impossible in the past to separate continuously these impurities directly from the green liquor by means of the methods and equipment so far utilized for attempting the continuous separation. I find, however, that if provision is made to continuously separate the impurities from the green liquor before the green liquor loses the considerable heat it possesses on leaving the dissolving tanks, obtained from the red hot smelt, a change occurs in the character of the constituents in their relation to the hot "green liquor" which causes the impurities to settle much more rapidly, and I accordingly make provision whereby, if necessary the green liquor is maintained at a suitable elevated temperature.

In the decanter, the impurities settle continuously to the bottom, leaving a clear liquid at the top, which is removed continuously through the pipe 12 into a tank 13 for clarified green liquor storage. The settled impurities and a small portion of the green liquor are drawn continuously from the bottom of the decanter 11 by any suitable means, and transferred to a filter 14 through the pipe 15. In the filter the remaining green liquor is separated from the impurities and returned by a suitable pipe to the storage tank 13. In some instances difficulty may be encountered in obtaining a clear filtrate, because of the tendency of the impurities to assume a colloidal condition. When this occurs a small amount of sand or other filter aid may be added to the subflow from the decanter before it reaches the filter. The solids in the sludge are small in quantity and accordingly they are discarded, after separation in the filter 14, without difficulty. Being small in quantity, they carry with them a negligible amount of the valuable pulping agent and they may accordingly be discarded directly from the filter, or they may, if desired, be washed by suitable treatment for the recovery of such soda values as occur in them, in which case the wash water may be returned to the system at a convenient point.

The clarified green liquor is drawn from the tank 13 and transferred continuously into a continuous causticizer 17, and mixed with milk of lime from the slaking tanks 18.

The supply of lime is desirably provided by the inclusion of one or more lime kilns 19 in the plant, which may desirably be of the rotary pattern, since this is best adapted to the reburning of the recovered sludge. The kilns 19 are arranged to discharge the burned lime upon a conveyor 20, to which the fresh lime required for the make-up of losses may be added. The conveyor transfers the lime into the slaking tanks 18 into which suitable slaking fluid, which may be clear water, or may be wash water, is admitted through suitable pipes 21. The lime is desirably held in suitable baskets 22 by means of which it is brought into contact with the contained water so that the lime will be fully slaked and transferred to the contents of the tank. The lime is thus converted to the form of milk of lime and fully slaked. The tanks are emptied by a suitable variable speed pump 23 which is adapted to adjust the flow of fluid in accordance with the flow of green liquor from the tank 13, into the causticizer 17.

The causticizer 17 may be of any convenient pattern, but is desirably one in which vigorous stirring occurs from the presence of hot air and steam, whereby a thorough causticization in a minimum time and with a maximum efficiency occurs. It may desirably be a form of tower causticizer previously disclosed to the art.

From the causticizer the liquor and sludge are then transferred continuously to the sludge decanters 24 in which the lime sludge settles to the bottom and the clear liquor rises to the top. The underflow, containing the lime sludge and a small amount of causticized liquor, passes through the pipe 25 to the sludge storage tank 26. The clear overflow is returned through pipes 27 to the storage tank for the white liquor from which it is supplied to the digesters 1, 2, 3 and 4, thereby completing the cycle for the pulping agent.

The sludge is passed from the storage tank 26 to filters 28 in which the greater part of the liquor is removed. The removed liquor is returned to the slaking tanks, at a convenient point to prevent loss of its contained values. The lime sludge separated by the filters is desirably washed to remove other values and the wash water likewise may be returned to the slaking tanks through pipe 21. The washed lime is transferred from the filters 28 to the lime kilns 19 and reburned therein, thereby also completing its cycle.

My invention thus provides a doubly cyclic process for the simultaneous preparation of the kraft or sulphate pulping liquor and the recovery and reutilization of the causticizing lime. In my system I provide means whereby the "green liquor" is treated to agglomerate and settle the impurities, and remove them from the solution, thereby preventing a contamination of the causticizing lime. As previously described, I prepare the green liquor in such a way that the solid impurities settle easily, and remove them by suitable means before further processing of the liquor. I then convey the clear green liquor to the causticizing device, in which the soda carbonate in the liquor is converted to hydroxide, and the lime changed to calcium carbonate. The spent lime is, however, not contaminated by impurities from the black ash and the smelter, and after recovery in the form of sludge from the "white liquor", it is substantially free from troublesome impurities, and by suitable treatment during the causticizing operation, it is caused to assume a form in which it is readily reburned in the customary rotary kiln.

By this system of my invention, the soda compounds in the pulping liquor are cyclically re-used in the fashion common to the art, whereby only such supplies of new pulping agent are required as must be added to make up the small losses in the cycle, such as those which occur from incomplete washing of the pulp. Likewise no large supply of fresh lime is required and no large quantity of spent lime must be disposed of. Only such new lime must be added as is required to compensate for the inevitable small losses which occur in the handling of any cyclic process. By this means a minimum of new lime is required, and a minimum of waste materials must be discarded, thereby producing a very substantial saving in the cost of materials for the pulping process, and a substantial simplification of the operation of the plant.

The previous description discloses but a single method by which the process of my invention may be applied. It is, however, capable of various modifications therefrom and the adaption of other elements therein, without departing from the spirit thereof, and it is desired therefore that only such limitations shall be imposed thereon as are required by the prior art or indicated by the appended claims.

I claim as my invention:

1. In a continuous process for preparing the pulping liquor for the sulphate process the steps of continuously supplying a quantity of green liquor to a continuous decanter, separating solids from the liquor therein, in the form of sludge, filtering the sludge, returning the filtrate to the process, discarding the solids, transferring the decanted liquor continuously to storage and continuously withdrawing the stored liquor for causticization.

2. In a continuous process for preparing the pulping liquor for the sulphate process the steps of continuously supplying a quantity of hot green liquor to a continuous decanter, separating solids from the liquor therein, in the form of sludge, filtering the sludge, returning the filtrate to the process, discarding the solids, transferring the decanted liquor continuously to storage and continuously withdrawing the stored liquor for causticization.

3. An apparatus for the doubly cyclic operation of the sulphate pulping process, comprising digesters for the production of a reaction between a solution and wood, and the production of pulp and spent liquor, means for the recovery of the soda compounds in the spent liquor, comprising incinerator, smelter, and dissolver, means for the separation of solid impurities therefrom comprising a continuous decanter adapted to the operation upon said dissolved soda compounds at an elevated temperature, means for the causticization of said soda compounds comprising a causticizer positioned subsequent to said decanter in the cycle, means for the separation of spent lime from the solution, and means comprising a filter and a kiln for the reactivation of said lime.

4. Apparatus for the operation of the sulphate pulping process comprising means for the production of pulp and spent liquor, means for the utilization and recovery of the soda compounds in the spent liquor, means for the recausticization thereof, comprising a causticizing tower, and means for the separation of impurities, comprising a continuous decanter positioned between said recovery means and said causticizer.

5. In a continuous process for preparing the pulping liquor for the kraft process the steps of continuously supplying a quantity of green liquor to a continuous decanter, separating solids from the liquor therein, discarding the solids, transferring the decanted liquor continuously to storage and continuously withdrawing the stored liquor for causticization.

6. A process for producing sulphate pulp which comprises the digesting of wood by means of the alkali liquor, the separating of the pulp and spent liquor, the recovering of the alkali materials from said liquor in solid impure condition, the dissolving thereof to form the green liquor, the separating of solid impurities therefrom by continuous decantation, the discarding of said impurities, the causticizing of the decanted liquor, the separating of sludge therefrom by decantation and the reuse of the clear decanted liquor for digesting of wood.

7. A process for producing sulphate pulp which comprises the digesting of wood by means of the alkali liquor, the separating of the pulp and spent liquor, the recovering of the alkali materials from said liquor in solid impure condition, the dissolving thereof to form the green liquor, the separating of solid impurities therefrom by continuous decantation, the discarding of said impurities, the causticizing of the decanted liquor, the separating of sludge therefrom by decantation, the recovering of lime from said sludge by calcination thereof, the reusing of said lime for causticizing, and the reuse of the clear decanted liquor for digesting of wood.

8. A continuous cyclic process for producing sulphate pulp which comprises the digesting of wood by means of the alkali liquor, the separating of the pulp and spent liquor, the recovering of the alkali materials from said liquor in solid impure condition, the dissolving thereof to form the green liquor, the separating of solid impurities therefrom by continuous decantation, the discarding of said impurities, the continuous causticizing of the decanted liquor, the separating of sludge therefrom by continuous decantation and the reuse of the clear decanted liquor for digesting of wood.

9. A continuous cyclic process for producing sulphate pulp which comprises the digesting of wood by means of the alkali liquor, the separating of the pulp and spent liquor, the recovering of the alkali materials from said liquor in solid impure condition, the dissolving thereof to form the green liquor, the separating of solid impurities therefrom by continuous decantation, the discarding of said impurities, the continuous causticizing of the decanted liquor, the separating of sludge therefrom by continuous decantation, the recovering of lime from said sludge by calcination thereof, the reuse of said lime for continuous causticizing, and the reuse of the clear decanted liquor for digesting of wood.

In witness whereof, I hereunto subscribe my signature.

WILLIAM CAULDWELL MUNRO.